United States Patent [19]

Yamanaka et al.

[11] Patent Number: 5,032,140
[45] Date of Patent: Jul. 16, 1991

[54] AQUEOUS LIQUID COMPOSITION OF NAPHTHALENE SULFONATE REACTIVE DYE WITH AT LEAST ONE LITHIUM OR TRI-ETHANOL AMMONIUM CATION

[75] Inventors: Nobuyuki Yamanaka, Tokyo; Kazuo Hanawa, Ageo; Eiichi Ogawa, Kasukabe, all of Japan

[73] Assignee: Nippon Kayaku Kabushiki Kaisha, Tokyo, Japan

[21] Appl. No.: 426,746

[22] Filed: Oct. 24, 1989

[51] Int. Cl.$^5$ .................. C09B 67/26; C09B 62/08
[52] U.S. Cl. .......................................... 8/527; 8/549; 8/682; 8/688; 8/696; 8/917; 8/918; 8/924; 8/937; 534/632; 534/638
[58] Field of Search ............. 534/632, 638; 8/527, 8/549

[56] References Cited

U.S. PATENT DOCUMENTS 4,780,104 10/1988 Yamauchi et al. .................. 8/527

FOREIGN PATENT DOCUMENTS 59-008763 1/1984 Japan .
59-8763A 1/1984 Japan .

Primary Examiner—A. Lionel Clingman
Attorney, Agent, or Firm—Henry C. Nields

[57] ABSTRACT

A reactive dye represented by the formula (I),

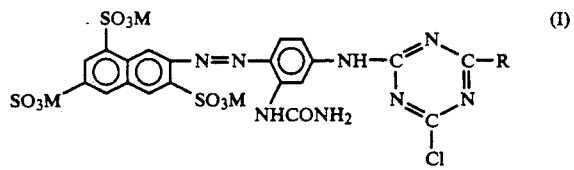

wherein R represents —$NH_2$ or —$NHC_2H_4SO_3M$, and M's independently represent $Li^\oplus$, $Na^\oplus$, $K^\oplus$ or $^\oplus NH(C_2H_4OH)_3$, provided that at least one of M's represents $Li^\oplus$ or $^\oplus NH(C_2H_4OH)_3$. This reactive dye easily gives a stable liquid composition and is useful to dye cellulosic or polyamide fibers.

5 Claims, No Drawings ns
AQUEOUS LIQUID COMPOSITION OF NAPHTHALENE SULFONATE REACTIVE DYE WITH AT LEAST ONE LITHIUM OR TRI-ETHANOL AMMONIUM CATION

BACKGROUND OF THE INVENTION

1. Field of the Invention

The present invention relates to a reactive dye.

2. Description of the Prior Art

Hitherto, reactive dyes are frequently used in a concentrated aqueous liquid form because such the liquid form, like other species of dyes, is not dusty and easy to handle in weighing, transportation, dissolution, etc. In order to further improve the storage stability of such the liquid form, various treatments such as desalting, addition of auxiliaries (e.g. $\epsilon$-caprolactam, polyvinylpyrrolidone), etc. are applied. However, in the case of the liquid composition of a reactive dye which is represented by the formula (Ia) as a free acid,

wherein R represents $-NH_2$, or $-NHC_2H_4SO_3H$, and commercially used as a dye in the form of a sodium or potassium salt, desired improvements in quality, for example prevention of the liquid composition from crystallization during prolonged storage at a low to room temperature, prevention of the liquid composition from freezing, etc. cannot be attained by mere desalting and addition of auxiliaries. Particularly, when the dye concentration is high, the difficulty becomes large.

Consequently, as to the reactive dye represented by the foregoing formula (Ia), it is desired to develop such a new dye form as to provide a concentrated aqueous liquid composition which will not freeze, nor produce dye crystals even by prolonged storage at a low to room temperature (about $-10°$ C. to $30°$ C).

SUMMARY OF THE INVENTION

The present inventors have extensively studied to solve the problems as described above, and as a result, have attained to the present invention. The present invention provides a reactive dye represented by the formula (I),

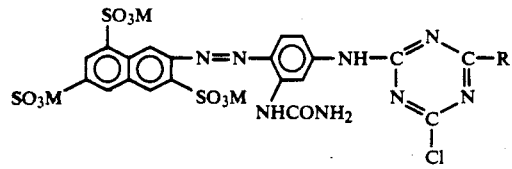

wherein R represents $-NH_2$ or $-NHC_2H_4SO_3M$, and M's independently represent $Li^\oplus$, $Na^\oplus$, $K^\oplus$ or $^\oplus NH(C_2H_4OH)_3$. provided that at least one of M's represents $Li^\oplus$ or $^\oplus NH(C_2H_4OH)_3$.

DESCRIPTION OF THE PREFERRED EMBODIMENT

The reactive dye of the present invention will be illustrated.

The reactive dye represented by the formula (Ia) is a known dye, and it is obtained, for example, by condensing a monoazo dye parent body represented by the formula (a),

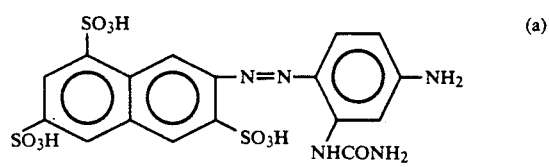

with taurine or ammonia and cyanuric chloride in any order.

In the reactive dye of the present invention represented by the formula (I), at least one of 3 to 4 sulfonic groups has a form of $-SO_3Li$ or $-SO_3NH(C_2H_4OH)_3$. In order to produce such the salt, for example in synthesizing the reactive dye represented by the formula (Ia), all or part of soda ash, sodium hydrogencarbonate, caustic soda, caustic potash, etc., which are usually used as a dissolving and neutralizing agents, are replaced by lithium hydroxide or triethanolamine. Thus, at least one of 3 to 4 sulfonic groups can be changed to a $-SO_3Li$ or $-SO_3NH(C_2H_4OH)_3$ group. In this case, lithium hydroxide or triethanolamine is used in an amount of 1 to 10 moles, more preferably 2 to 4 moles based on 1 mole of the reactive dye represented by the formula (Ia). This amount of lithium hydroxide or triethanolamine may be added in portions at the time of synthesis of the monoazo dye parent body represented by the formula (a) or that of condensation of said dye parent body with ammonia or taurine and cyanuric chloride (primary condensation and secondary condensation), or all of it may be added at a time.

The reaction solution thus obtained is then concentrated preferably by vaporization, and more preferably by desalting by reverse osmosis. Thus, a concentrated reaction solution containing the reactive dye of the formula (I) of the present invention is obtained. Then, the reactive dye of the formula (I) is obtained by vaporizing the concentrated reaction solution to dryness.

A preferred form of use of the reactive dye represented by the formula (I) is a liquid composition. A liquid composition containing this reactive dye is prepared by adding water to the dye so that the concentration of the dye is usually 10 to 40%. Alternatively, it is also possible to obtain the liquid composition by concentrating a foregoing reaction solution until the concentration of the reactive dye is 10 to 40%, preferably 20 to 35%.

To the liquid composition containing the reactive dye of the formula (I) of the present invention may be added if necessary a hydrotropic agent usually used to prepare a liquid composition of water-soluble dyes. Such the hydrotropic agent includes polyacrylic acid salts such as sodium polyacrylate, potassium polyacrylate, etc.; $\epsilon$-caprolactam; polyethylene glycol; polypropylene glycol; triethanolamine; N-methylpyrrolidone; poval, etc. Further, adjusting the pH of the resulting liquid composition to 6.0 to 8.5 is effective in further improving the stability during the lapse of time.

As a filter medium used in reverse osmosis, polybenzimidazolone, cellulose acetate, partially saponified cellulose acetate, etc. are used.

The aqueous liquid composition containing the reactive dye of the present invention represented by the formula (I) has high concentration and is stable to prolonged storage at a low to room temperature, and it does not freeze, nor produce dye crystals during the period of storage. Consequently, it is used to dye cotton, rayon, polyamide (Nylon, silk) and blended fibers containing them according to the usual dyeing method.

The present invention will be illustrated in more detail with reference to the following examples. In the examples, parts mean part by weight, and % means wt%.

EXAMPLE 1

104 Parts, converted to a free acid basis, of the disodium salt of 2-naphthylamine-3,6,8-trisulfonic acid was diazotized and coupled with 38.7 parts of m-aminophenylurea in the presence of 48 parts of sodium hydrogencarbonate to obtain a monoazo dye parent body. This dye parent body was primary-condensed with 47.3 parts of cyanuric chloride at 0° C. to 5° C. while maintaining the pH at 6 to 7 with 12 parts of triethanolamine (primary condensation). At a point when the remainder of the monoazo dye parent body was no longer detected, 33.6 parts of taurine was added (secondary condensation). The reaction solution was gradually heated to 50° C. while neutralizing it to a pH of 6.7 to 7.3 with 84 parts of triethanolamine, and kept at 50° C. to complete the secondary condensation.

This reaction solution was desalted and concentrated on a reverse osmosis apparatus to obtain a concentrated aqueous liquid composition (550 parts).

The reverse osmosis apparatus was provided with a polybenzimidazolone membrane (produced by Teijin Engineering Co.), and reverse osmosis treatment was carried out under conditions that the membrane area was 200 cm² and pressure was 25 to 35 kg/cm².

The structure of a dye contained in this liquid composition was analyzed, and it was found that this dye was one represented by the formula (II),

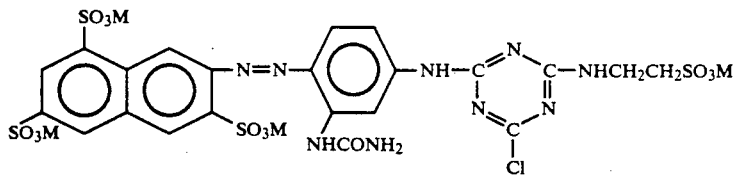

wherein among four M's, one M was $\oplus NH(C_2H_4OH)_3$ and other three M's were $Na^\oplus$. The dye content of the liquid composition was 30%, and the composition contained 0.2% of NaCl and 0.05% of Na$_2$SO$_4$.

EXAMPLE 2

104 Parts, converted to a free acid basis, of the disodium salt of 2-naphthylamine-3,6,8-trisulfonic acid was diazotized and coupled with 38.7 parts of m-aminophenylurea in the presence of 63 parts of triethanolamine to obtain a monoazo dye parent body. To the resulting solution was added 47.3 parts of cyanuric chloride, and the primary condensation was carried out at 0° to 5° C. while maintaining the pH at 6 to 7 with 40 parts of triethanolamine. Subsequently, the secondary condensation was carried out in the same manner as in Example 1. The resulting reaction solution was desalted and concentrated by reverse osmosis in the same manner as in Example 1 to obtain a concentrated aqueous liquid composition (450 parts). A dye contained in this liquid composition was one represented by the formula (II) wherein among four M's, two M's were $\oplus NH(CH_2CH_2OH)_3$ and other two M's were $Na^\oplus$. The dye content of the liquid composition was 36%.

EXAMPLE 3

The primary condensation was completed according to Example 2, and to the resulting reaction solution was added 52 parts of a 25% aqueous ammonia. Thereafter, the reaction solution was gradually heated to 50° C. while maintaining the pH at 8 to 10, and kept at 50° C. to complete the secondary condensation.

This reaction solution was desalted and concentrated by reverse osmosis to obtain a concentrated aqueous liquid composition (510 parts). The resulting liquid composition was analyzed, and it was found that a dye contained in the composition was one having a structure represented by the formula (III),

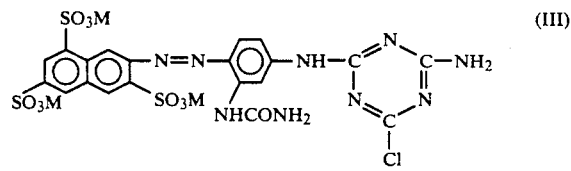

wherein among three M's, one M was $\oplus NH(C_2H_4OH)_3$ and other two M's were $Na^\oplus$. The dye content of the liquid composition was 27%.

EXAMPLE 4

A monoazo dye parent body was synthesized according to Example 1, and then the primary condensation of this dye parent body with 47.3 parts of cyanuric chloride was carried out at 0° C. to 5° C. while maintaining the pH at 6 to 7 with a 10% aqueous LiOH solution. Subsequently, after adding 33.6 parts of taurine, the reaction solution was gradually heated to 50° C. while neutralizing it to a pH of 6.8 to 7.5 with a 10% aqueous LiOH solution and kept at 50° C. to complete the secondary condensation. The resulting reaction solution was desalted and concentrated by reverse osmosis to obtain a concentrated aqueous liquid composition (450 parts). This liquid composition was analyzed and it was found that the composition contained a dye represented the formula (II) wherein among four M's, two M's were $Li^\oplus$) and other two M's were $Na^\oplus$. The dye content of the liquid composition was 35%.

EXAMPLE 5

According to Example 3, dye synthesis was carried out using a 10% LiOH alone as a neutralizing agent necessary for the synthesis and then the resulting reaction solution was desalted and concentrated to obtain a concentrated aqueous liquid composition (500 parts). This composition was found to contain a dye represented by the formula (III) wherein among three M's, two M's were Li⊕ and the other M was Na⊕. The dye content of the liquid concentration was 27%.

EXAMPLE 6

Dye synthesis, desalting and concentration were carried out according to Example 1 except that the disodium salt of 2-naphthylamine-3,6,8-trisulfonic acid was replaced by the dipotassium salt of the same trisulfonic acid, to obtain a concentrated aqueous liquid composition (550 parts). This liquid composition was found to contain a dye represented by the formula (II) wherein among four M's, one M was ⊕NH(C₂H₄OH)₃, and other two M's were K⊕ or Na⊕. The dye content of the liquid composition was 30%.

1 Part of sodium polyacrylate was added to 100 parts of the liquid composition and 10 parts of ε-caprolactam was added to 100 parts of the liquid composition to obtain another present liquid composition respectively and these liquid compositions have very stable to prolonged strage at a low to room temperature.

EXAMPLE 7

104 Parts, converted to a free acid basis, of the dipotassium salt of 2-naphthylamine-3,6,8-trisulfonic acid was diazotized and coupled with 38.7 parts of m-aminophenylurea in the presence of 48 parts of sodium hydrogencarbonate to obtain a monoazo dye parent body. This dye parent body was primary-condensed with 47.3 parts of cyanuric chloride at 0° to 5° C. while maintaining the pH at 6 to 7.5 with 40 parts of triethanolamine. Subsequently, after adding 33.6 parts of taurine, the reaction solution was gradually heated to 50° C. while neutralizing it to a pH of 7 to 7.5 with 120 parts of 10% LiOH and kept at 50° C. to complete the secondary condensation. The resulting reaction solution was desalted and concentrated to obtain a concentrated aqueous liquid composition (540 parts). This composition was found to contain a dye represented by the formula (II) wherein among four M's, one M was Li⊕ or ⊕NH(C₂H₄OH)₃ and the other M's were K⊕ or Na⊕. The dye content of the liquid composition was 30%.

EXAMPLE 8

100 Parts of the concentrated aqueous liquid composition after desalting and concentration, obtained in the same manner as in Example 4, was diluted to 5000 parts with ion-exchanged water (A solution). Separately, 100 parts of an ion-exchange resin (Diaion SKIB; produced by Mitsubishi Kasei Kogyo Co., Ltd.) was taken in a 1-liter beaker, 500 parts of a 10% aqueous hydrochloric acid solution was added thereto, the mixed solution was stirred for 5 hours and filtered, and the resin on the filter was washed with 5000 parts of ion-exchanged water (B resin).

The B resin was added to the A solution, and after 24 hours' stirring, the dye solution was separated by filtration. Lithium hydroxide was added to this dye solution to adjust the pH to 7.5, and the solution was concentrated by vaporization at 60° C. to obtain 80 parts of an aqueous liquid composition C. The dye content of this liquid composition was 40%, and analysis showed that among four M's, all the M's were Li⊕.

Stability test was made on this aqueous liquid composition C according to the method described in the comparative example. As a result, it was found that this liquid composition maintained a complete solution state even after 90 days' storage at −5° C.

EXAMPLE 9

100 Parts of the concentrated aqueous liquid composition obtained in the same manner as in Example 4 was heat-dried under reduced pressure by means of an evaporator to obtain 35 parts of a dry solid dye. This dye was printed onto cotton cloth according to the application example to obtain a dyed-product having high levelling-property. This solid dye was also superior in solubility in water.

COMPARATIVE TEST

In order to measure the stability at low temperature of the aqueous liquid compositions obtained in the present invention, each of liquid compositions obtained in Example 1 to Example 7 was diluted with water to prepare a solution having a dye content of 20%, and the stability test was carried out as follows.

The reaction solutions containing the following dyes IV, V and VI, respectively, were desalted and concentrated by reverse osmosis so that the content of inorganic salts was 0.5% or less to obtain a liquid composition. The liquid composition was diluted with water to obtain a solution having a dye content of 20%, respectively.

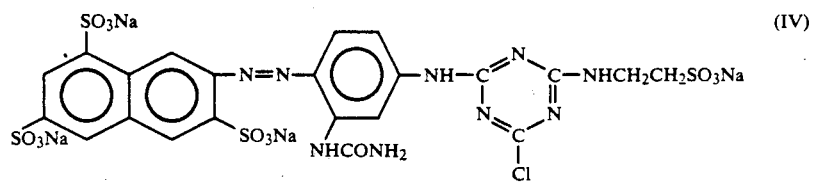

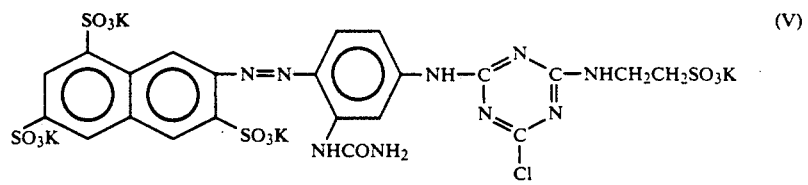

-continued

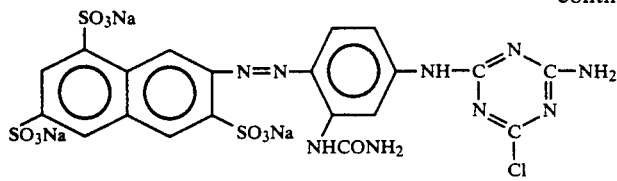

TABLE 1

| Data of low-temperature stability test | Time elapsed (day) (storage at −5° C.) | | | | | |
|---|---|---|---|---|---|---|
| | 1 | 2 | 14 | 30 | 60 | 90 |
| Concentrated solution of (IV) | ○ | ○ | Δ | x | x | x |
| Concentrated solution of (V) | x | x | x | x | x | x |
| Concentrated solution of (VI) | Δ | x | x | x | x | x |
| Liquid composition of Example 1 | ○ | ○ | ○ | ○ | Δ | Δ |
| Liquid composition of Example 2 | ○ | ○ | ○ | ○ | ○ | ○ |
| Liquid composition of Example 3 | ○ | ○ | ○ | Δ | Δ | Δ |
| Liquid composition of Example 4 | ○ | ○ | ○ | ○ | ○ | ○ |
| Liquid composition of Example 5 | ○ | ○ | ○ | ○ | ○ | Δ |
| Liquid composition of Example 6 | ○ | ○ | ○ | ○ | Δ | x |
| Liquid composition of Example 7 | ○ | ○ | ○ | ○ | ○ | ○ |

In the table:
○: Complete solution state
Δ; A little crystallization
x; much crystallization nearly all over the solution or freezing

APPLICATION EXAMPLE a liquid composition having a dye content of 20% was prepared from the liquid composition of the present invention obtained in Example 1. A color paste having the following composition was prepared using the liquid composition thus obtained and printed onto cotton cloth. The cloth was then steamed at 102° C. for 10 minutes to obtain a yellow printed product.

| | |
|---|---|
| A liquid composition prepared from the liquid composition of the present invention obtained in Example 1 | 10 parts |
| 5% Aqueous sodium alginate solution | 50 parts |
| Sodium hydrogencarbonate | 2 parts |
| Urea | 5 parts |
| Water | 33 parts |

What is claimed is:

1. A reactive dye represented by the formula (I),

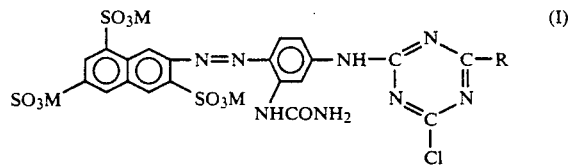

wherein R represents —NH$_2$ or —NHC$_2$H$_4$SO$_3$M, and M's independently represent Li$^\oplus$, Na$^\oplus$, K$^\oplus$ or $^\oplus$NH(C$_2$H$_4$OH)$_3$, provided that at least one of M's represents Li$^\oplus$ or $^\oplus$NH(C$_2$H$_4$OH)$_3$.

2. An aqueous liquid composition containing a reactive dye according to claim 1.

3. An aqueous liquid composition according to claim 2, wherein the content of the dye is 10 to 40%.

4. An aqueous liquid composition according to claim 2, wherein a hydrotropic agent is added.

5. An aqueous liquid composition according to claim 2, wherein pH is 6.0 to 8.5.

* * * * *